United States Patent
Thompson et al.

(10) Patent No.: US 10,870,447 B2
(45) Date of Patent: Dec. 22, 2020

(54) BRAKE SYSTEM FOR STEERING FEEDBACK

(71) Applicant: Deere & Company, Moline, IL (US)

(72) Inventors: Michael Thompson, Clayton, IN (US);
Eric A. Keen, Manhattan, KS (US);
Gary H. Wenzel, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 435 days.

(21) Appl. No.: 15/834,880

(22) Filed: Dec. 7, 2017

(65) Prior Publication Data

US 2019/0176882 A1 Jun. 13, 2019

(51) Int. Cl.
| | | |
|---|---|---|
| *B62D 6/00* | (2006.01) | |
| *B62D 5/00* | (2006.01) | |
| *B62D 5/04* | (2006.01) | |
| *B62D 5/09* | (2006.01) | |
| *B62D 5/22* | (2006.01) | |

(52) U.S. Cl.
CPC ............. *B62D 6/008* (2013.01); *B62D 5/005* (2013.01); *B62D 5/0481* (2013.01); *B62D 5/092* (2013.01); *B62D 5/046* (2013.01); *B62D 5/22* (2013.01)

(58) Field of Classification Search
None
See application file for complete search history.

(56) References Cited

U.S. PATENT DOCUMENTS

| | | | | |
|---|---|---|---|---|
| 6,547,031 | B1* | 4/2003 | Magnus | B62D 5/003 180/444 |
| 2002/0189888 | A1* | 12/2002 | Magnus | B62D 5/006 180/402 |
| 2006/0200291 | A1* | 9/2006 | Wroblewski | B62D 6/002 701/41 |
| 2007/0169984 | A1* | 7/2007 | Ogawa | B62D 6/008 180/402 |
| 2013/0075185 | A1* | 3/2013 | Sugai | B62D 5/001 180/402 |
| 2013/0099554 | A1* | 4/2013 | Lee | B60K 7/0007 301/6.5 |
| 2015/0144418 | A1* | 5/2015 | Ohno | B62D 6/008 180/446 |
| 2016/0174454 | A1* | 6/2016 | Phan | A01B 69/008 701/301 |
| 2017/0110933 | A1* | 4/2017 | Michel | H02K 7/14 |
| 2017/0197652 | A1* | 7/2017 | Uchibori | B62D 3/12 |

\* cited by examiner

*Primary Examiner* — Truc M Do
(74) *Attorney, Agent, or Firm* — Klintworth & Rozenblat IP LLP (57) ABSTRACT

A brake system for providing tactile feedback in a vehicle steering system. The brake system includes an input shaft, and a rotor responsive to the shaft to rotate in response to input steering wheel inputs. A friction element imparts a base load to the rotor, and an electromagnetic coil imparts a variable load to the rotor. A housing of the brake system includes a fixed component and an intermediate component threaded together to set the base load. An adjustable component of the housing is threaded to the intermediate component to calibrate the variable load. The friction element is disposed between, and engages, both the rotor and the intermediate housing to impart the feedback loads.

20 Claims, 4 Drawing Sheets

BRAKE SYSTEM FOR STEERING FEEDBACK

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to the steering of vehicles, and more particularly to force feedback in steer-by wire systems.

BACKGROUND OF THE DISCLOSURE

In various settings, relatively precise steering of vehicles may be important. For example, in agricultural settings it may be important to precisely steer an agricultural vehicle across a field in order to seed, tend, harvest, or otherwise process crops or other material. Typically, on-road and off-road vehicles use a mechanical system boosted by hydraulic power to turn the wheels for steering.

In certain vehicles, steering is provided by a system that uses electrical or electro-mechanical components for performing at least some of the steering functions previously performed by mechanical linkages and/or hydraulic components. When the steering linkage includes electric components between the steering wheel and the steered wheels, an operator may not have the typical feel associated with steering a vehicle. To most effectively control a vehicle, an operator requires certain feedback from the steering system.

SUMMARY OF THE DISCLOSURE

A brake system for providing tactile feedback is described for a vehicle having steerable wheels.

According to one aspect of the disclosure, a brake system includes an input shaft and a rotor responsive to the shaft which rotates in response to steering inputs. A friction element imparts a base load to the rotor. A housing contains the shaft, the rotor and the friction element. The housing has a fixed housing component, an adjustable housing component that is variably positioned relative to the fixed housing component, and an intermediate housing component that couples the fixed housing component with the adjustable housing component. The friction element is disposed between, and engages, both the rotor and the intermediate housing to impart the base load.

In other aspects, the brake system includes a drive disc engaged between the shaft and the rotor. In certain embodiments, the drive disc compensates for non-concentricity between the shaft and the rotor so that a smooth torque curve is maintained during rotation of the rotor.

In additional aspects, a brake system includes a shaft that receives a steering input from a steering wheel. A drive disc is engaged with the shaft, and a rotor is engaged with the drive disc to rotate in response to the steering input. The drive disc is configured to provide a smooth torque transfer between the shaft and the rotor without torque spikes. A friction element engages the rotor and imparts a base load that requires a set torque to rotate the rotor and the connected steering wheel. An electromagnetic coil is disposed adjacent the rotor to apply a variable load in addition to the base load to increase the torque above the set value. A housing is disposed around the shaft, the rotor, the friction element, and the electromagnetic coil. The housing has a fixed housing component connected with the vehicle, an adjustable housing component that is variably positioned relative to the fixed housing component, and an intermediate housing component that couples the fixed housing component with the adjustable housing component. The friction element is disposed between and engages both the rotor and the intermediate housing component.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed brake systems for steering feedback as shown in the accompanying figures of the drawings described briefly above. Various modifications to the example embodiments may be contemplated by one of skill in the art.

As noted above, known steering control systems may employ a mechanical link as a main connector between a steering input device (e.g., a steering wheel) and a control system for the steering various wheels of a vehicle. For example, a rack and pinion assembly or other linkage may be utilized to tie a steering wheel to the wheels of a vehicle, or to a steering device connected to the wheels. Use of such a mechanical link, however, may impede various strategies for automating (including partially automating) steering control. For example, a mechanical link (e.g., a rack and pinion arrangement or other linkage) may be utilized to connect a steering input device (e.g., a steering wheel) to a steering control device (e.g., a control valve for a hydraulic pump or motor), such that any manual steering input received at the steering input device is conveyed by the mechanical link to the steering control device. Accordingly, in order to steer the vehicle, an operator may provide a manual steering input at the steering wheel, thereby causing the mechanical link to mechanically control the steering control device. It may be useful to provide a steering system in which the mechanical link between the steering input device and a steering control device is supplanted with electrically controlled elements. In this way, a more efficient and effective transition to advanced steering systems may be obtained.

In one or more example implementations of the disclosed system, a brake system includes an input shaft and a rotor responsive to the shaft to rotate in response to steering inputs. A friction element imparts a base load to the rotor. A housing contains the shaft, the rotor and the friction element. The housing has a fixed housing component, an adjustable housing component that is variably positioned relative to the fixed housing component, and an intermediate housing component that couples the fixed housing component with the adjustable housing component. The friction element is disposed between, and engages, both the rotor and the intermediate housing to impart the base load. The base load is set by positioning the housing components in relation to one another.

Example environments in which a brake system for steering feedback may be implemented include work vehicles and other vehicles that use steer-by-wire or other advanced steering systems. Example work vehicles include a tractor, loader, excavator, harvester, truck, dozer, skid steer, and other vehicles for off-road uses, including those used in the construction, agriculture, or forestry industries. Other vehicles include passenger vehicles, other on-road vehicles, recreation vehicles, tow-vehicles, and load carrying vehicles.

The following description relates to brake systems in the context of certain vehicle steering applications for purposes of demonstrating examples. In steering systems, electric operators may be employed and their individual actuation requirements are determined by the architecture and operation of the vehicle. The present disclosure is not limited to any particular vehicle applications, or to any particular steer-by-wire or advanced steering system operation regime, but rather also encompasses any application where steering is operated through a system that may benefit from feedback of a brake system. Accordingly, the teachings of the present disclosure may be applied to steering systems in a variety of applications, including in work vehicle steer-by-wire systems, when desired.

Figure 1:
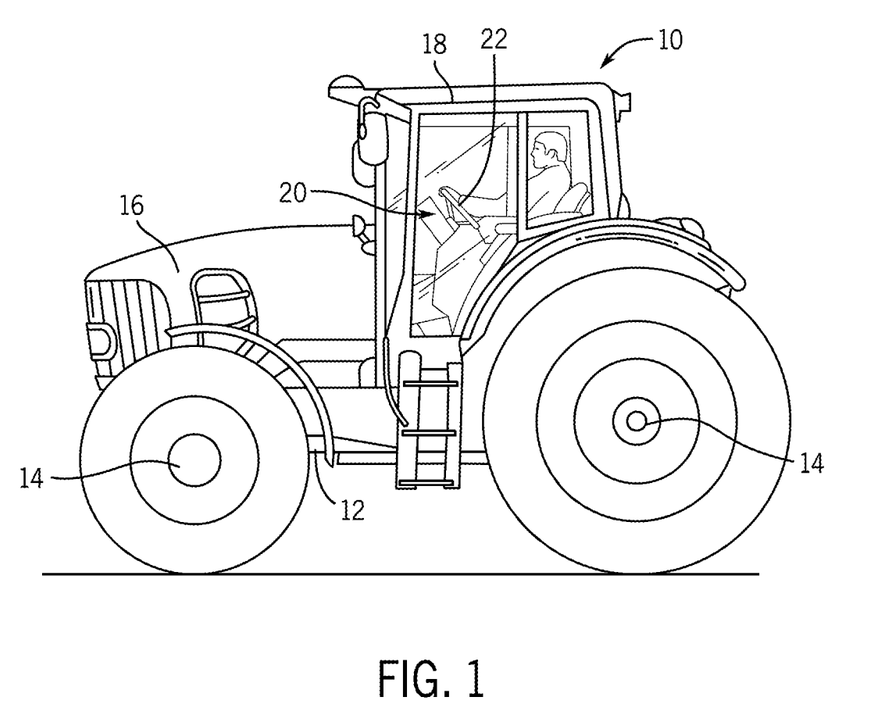
FIG. 1 is a side view of an example work vehicle in the form of an agricultural tractor in which the disclosed brake system for steering feedback may be used.

As noted above, the disclosed brake system described herein may be employed in a variety of steering applications. Referring to FIG. 1, one example involves a steering system that may be included in a work vehicle 10, which in this example is depicted as an agricultural tractor. It will be understood, however, that other configurations are contemplated, including configurations with work vehicle 10 as a different kind of tractor, or as a work vehicle used for other aspects of the agriculture industry or for the construction or forestry industries (e.g., a harvester, a log skidder, motor grader, and so on). It will further be understood that the disclosed brake system may also be used in non-work vehicles, non-vehicle applications (e.g. stationary installations), and with other types of equipment and machines where a brake system for steering feedback is useful. In the current example, the work vehicle 10 has a frame or chassis 12 supported by wheels 14 that engage the ground. Two or four of the wheels 14 may be powered for propelling the work vehicle 10 and at least the front wheels 14 are steerable to control the direction of travel. The chassis 12 supports a power plant in the form of an internal combustion engine, in this example, referred to as an engine 16. A powertrain transmission (not shown), connects the engine 16 with the wheels 14 to provide different speed ratios for varying operating conditions. An operator cabin 18 is provided in which operator interface and control means (e.g., various controls wheels, levers, switches, buttons, screens, keyboards, etc.), are stationed. One of the controls available to the operator is a steering system 20 with a steering wheel 22 for receiving steering inputs from the operator. The steering wheel 22 also serves as an interface for delivering feedback from the steering system 20 to the operator.

In an example, the steering system 20 is in general, a steer-by-wire system that reduces steering effort when appropriate and optimizes driving comfort and control. Through the steering system 20, the work vehicle 10 may be maintained on track with minimal effort. Automatic adjustment of wheel angle may be provided. Variable ratio steering automatically adjusts to provide light, agile steering feedback for certain functions, and heavier steering feedback in other conditions where the steering wheel 22 offers greater resistance. More specifically, and with reference to FIG. 2, the steering system 20 includes the steering wheel 22 which is connected with a steering input shaft 24 that transmits inputs on the steering wheel 22 made by the operator and transmits feedback from the steering system 20 to the operator through the steering wheel 22. The steering input shaft 24 is connected with a brake system 26, that varies the steering effort required, providing tactile feedback to the operator, and provides various functions as further described below. The brake system 26 is connected, directly, or indirectly, with the vehicle chassis 12 for support, and includes an electrical interface in the form of a connector 30. A steering angle sensor 28 is mounted to the brake system 26 and is configured to sense changes in steering angle, including those supplied by the operator through the steering wheel 22. The steering angle sensor 28 also includes an electrical interface in the form of a connector 32. The steering angle sensor 28 detects rotation of the shafts associated with steering wheel 22 and provides an electrical signal representing the rotation. The steering angle sensor 28 may be any of a variety of sensor types, including Hall effect sensors, optical sensors, rotary potentiometers, or others.

Figure 2:
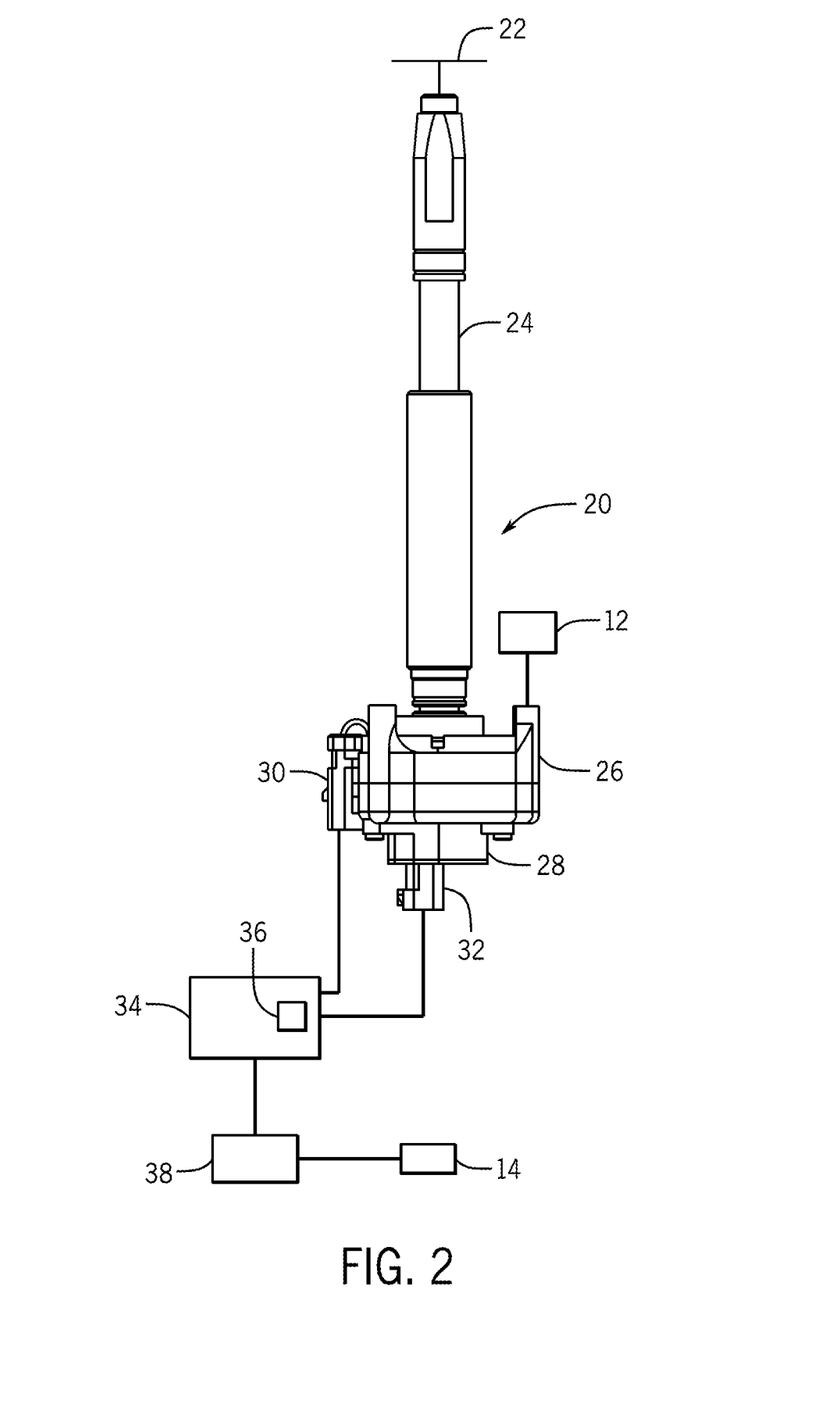
FIG. 2 is a schematic view of an example steering system with brake feedback.

The steering system 20 interacts with the steerable wheels 14 electronically, and without a complete mechanical linkage between the steering wheel 22 and the wheels 14. The brake system 26 and the steering angle sensor 28 are electrically coupled with the electrical system 34 of the work vehicle 10. The electrical system 34 includes one or more electronic controllers 36 that provide various functions in controlling operations, including those of the brake system 26. The controller 36 may be configured as a computing device with one or more processors and memory architectures, or as another device capable of carrying out control functions and interfacing with the involved components. The electrical system 34 is coupled with and controls at least one electric actuator 38 that is coupled with the wheels 14 to steer the work vehicle 10 by varying the angle of the steerable wheels 14. The steering angle sensor 28 may detect a rate (or degree) of steering at the steering wheel 22 and may provide corresponding steering signals to the controller 36. Based upon these steering signals, the controller 36 may then control the electric actuator 38 to change the angle of the wheels 14.

Figure 3:
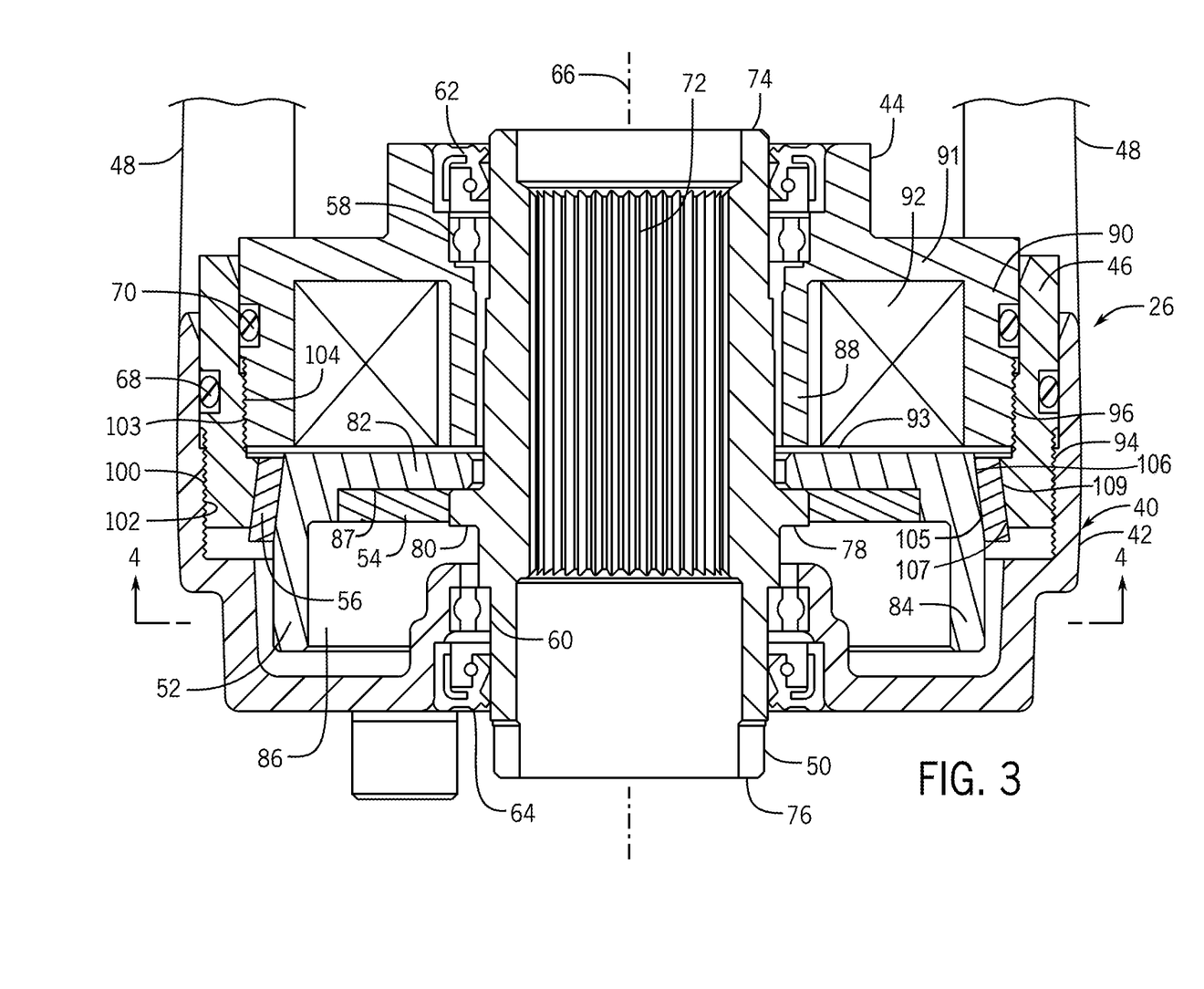
FIG. 3 is a cross sectional illustration of a brake system.

Referring to FIG. 3, the brake system 26 is illustrated in greater detail. As noted above, the brake system 26 is included in the steering system 20 and provides variable tactile feedback in the form of variable resistance to steering inputs. Variation is useful, for example, to increase the amount of torque needed to turn the steering wheel 22 when the wheels 14 approach the end of steering travel at the end of the turning range. Also for example, the steering effort may be increased when the operator turns the steering wheel 22 at a fast turning rate. In these examples, some objectives include providing useful steering feedback to the operator. Also for example, to minimize operator fatigue, the amount of torque required to turn the steering wheel 22 may be reduced to a comfortable base level, requiring less steering effort at other operating conditions.

The brake system 26 has a housing 40 that includes a fixed housing component 42, an adjustable housing component 44 and an intermediate housing component 46. The fixed housing component 42 is configured to be mounted to the chassis 12, or a connected structural element of the work vehicle 10, through a number of mounting legs 48. As such, the fixed housing component 42 provide a secure base for the brake system 26. The adjustable housing component 44 cooperates with the fixed housing component 42 to define an enclosure for housing, at least partly, various components of the brake system 26. The adjustable housing component 44 and the fixed housing component 42 are coupled with each other through the intermediate housing component 46.

A shaft 50 generally extends through the housing 40 and is configured to rotate in response to inputs on the steering wheel 22. A rotor 52 is generally annular is shape and is disposed around the shaft 50 to rotate therewith. A drive disc 54 is engaged between the shaft 50 and the rotor 52 to transfer rotation between the two. The drive disc 54 is configured to transfer torque and other loads between shaft 50 and the rotor 52. A friction element 56 is positioned between, and engages, the rotor 52 and the intermediate housing component 46. The friction element 56 is shaped as a hollow conical section, and may be made from a wear resistant material such as metal, ceramic, composite, or another material. A material with a very high coefficient of friction is generally not needed because the objective of the brake system 26 is to generate variable frictional forces that result in variable steering torque input requirements of an operator, such as those delivered through normal manual inputs on the steering wheel 22.

In this example, the shaft 50 is supported in the housing 40 by two bearings 58, 60. In the current example the bearings 58, 60 are rolling ball bearings contained between inner and outer races. In other examples, different types of bearings may be used, such as journal bearings, or other types. The bearings 58, 60 and other internal components are protected from foreign material by seals 62, 64 that encircle the shaft 50 and are seated in the housing 40. In this example, the seals 62, 64 are mechanical, reinforced, lip seal assemblies. Similarly, the mating surfaces between the intermediate housing component 46, and both the fixed housing component 42 and adjustable housing component 44, contain seals 68, 70, which in this example are O-ring seals.

The shaft 50 generally has the shape of a hollow cylinder with internal splines 72 for mating with the steering input shaft 24 (shown in FIG. 2), so that the two rotate together without slippage. The shaft 50 extends through the seal 62 and includes an input end 74 that projects out of the adjustable housing component 44. The shaft 50 extends from the input end 74 through the housing 40 and the seal 64 to a sensor end 76, which projects out of the fixed housing component 42 and is adapted to cooperate with the steering angle sensor 28 (shown in FIG. 2). In this example, parts (not shown) of the steering angle sensor 28 may be contained within the hollow sensor end 76 of the shaft 50. The shaft 50 also includes a pair of tangs 78, 80 that project radially outward in the area of the drive disc 54, as further described below.

In the example of FIG. 3, the rotor 52 is generally annular in shape and is disposed to rotate generally around an axis 66 that extends longitudinally through the center of the shaft 50. The rotor 52 includes a radially extending disc-like section 82 that extends from an area adjacent the shaft 50 outward toward the friction element 56. The section 82 joins with a section 84 that extends generally in an axial direction and surrounds the section 82 forming an L-shaped cross section. The rotor 52, with the sections 82, 84, forms a cavity 86 within which the drive disc 54 is received, and the section 82 includes a step 87 that contains the drive disc 54. The section 84 includes an outer surface around its outer perimeter that contacts the friction element 56.

The adjustable housing component 44 includes an inner annular wall 88 disposed around the shaft 50 and an outwardly spaced, outer annular wall 90. The inner and outer annular walls 88, 90 are joined by a disc-shaped section 91, and between the three, an electromagnetic coil 92 is carried. The electromagnetic coil 92 is positioned across an air gap 93 from the rotor 52, and specifically from the section 82. The electromagnetic coil 92 is configured to generate an electric field that acts on the rotor 52 as further described below.

The housing 40 includes mating threads 94 between the fixed housing component 42 and the intermediate housing component 46. In addition, the housing 40 includes mating threads 96 between the intermediate housing component 46 and the adjustable housing component 44. The mating threads 94, 96 are disposed to spiral around the axis 66 with a pitch that extends in the axial direction to drive threading action in the axial direction, that is, parallel to the axis 66. More specifically, the intermediate housing component 46 includes external threads 100 and the fixed housing component 42 includes internal threads 102, which together comprise the mating threads 94. In addition, the adjustable housing component 44 includes external threads 103 and the intermediate housing component 46 includes internal threads 104, which together comprise the mating threads 96.

The intermediate housing component 46 is at least partly received within the fixed housing component 42 so as to be threaded into the fixed housing component 42. As a result, turning or rotating the intermediate housing component 46 relative to the fixed housing component 42 moves the intermediate housing component 46 in the axial direction. The effect is to move the intermediate housing component 46 toward, or away from, the friction element 56 to adjust the amount of friction acting on the rotor 52. In this example, the rotor 52 is held from moving away from the friction element 56 in the axial direction, by the tangs 78, 80 of the shaft 50. Threading the intermediate housing component 46 into the fixed housing component 42 forces its surface 107 against the outer surface 109 of the friction element 56 and forces the inner surface 105 of the friction element 56 against the surface 106 of the rotor 52. Accordingly, varying the mating threads 94 by threading the intermediate housing component 46 further into the fixed housing component 42 increases the friction acting on the rotor 52. Threading the intermediate housing component 46 further out of the fixed housing component 42 decreases the amount of friction acting on the rotor 52. By so varying the mating threads 94, an amount of base load is set on the rotor 52 from the friction element 56. The base load determines the amount of effort in the form of torque that the operator must apply to the steering wheel 22 to steer the work vehicle 10.

The adjustable housing component 44 is at least partly received within the within the intermediate housing component 46 so as to be threaded into the intermediate housing component 46. As a result, turning or rotating the fixed housing component 42 relative to the intermediate housing component 46 moves the adjustable housing component 44 in the axial direction. The effect is to move the adjustable housing component 44 toward or away from the rotor 52. In this example, the rotor 52 is held from moving away from the friction element 56 in the axial direction by the tangs 78, 80. Threading the adjustable housing component 44 into, or out of, the intermediate housing component 46 adjusts the size of the air gap 93. Accordingly, varying the mating threads 96 by threading the adjustable housing component 44 further into the intermediate housing component 46 reduces the air gap 93 and increases the electromagnetic force acting on the rotor 52 when the electromagnetic coil 92 is energized. Threading the adjustable housing component 44 further out of the intermediate housing component 46 increases the size of the air gap 93 reducing the electromagnetic force acting on the rotor 52 when the electromagnetic coil 92 is energized. By so varying the mating threads 96, a variable load on the rotor 52 from the electromagnetic coil 92 is calibrated. The variable load is added to the base load of the friction element 56 and determines the amount of effort in the form of torque that the operator must apply to the steering wheel 22 to steer the work vehicle 10. In the case of the variable load, the electromagnetic coil 92, when energized, draws the rotor 52 toward it, forcing the surface 106 of the rotor against the inner surface 105 of the friction element 56. The amount of the force is variable in proportion to the amount of current supplied to the electromagnetic coil 92 by the electrical system 34. For example, when the steering input to the steering wheel 22 is approaching the end of steering travel for turning the steerable wheels 14, the controller 36 supplies current to the electromagnetic coil 92 increasing the frictional load on the rotor 52, requiring greater effort by the operator to continue turning the wheel. The current may be increased progressively to cause the effort required to turn the steering wheel 22 to become inhibitive when the wheels 14 are turned to their fullest extent.

Figure 4:
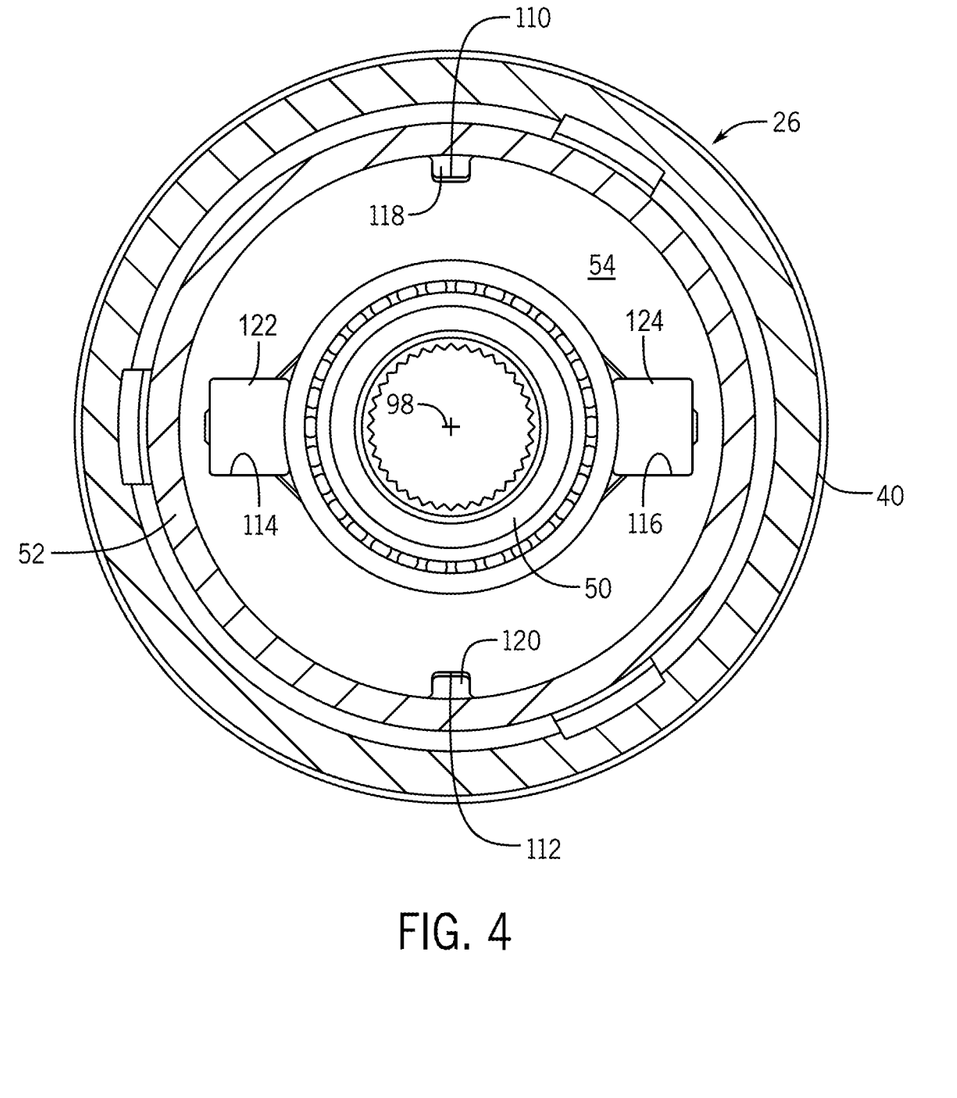
FIG. 4 is a cross section taken generally through the line 4-4 in FIG. 3.

Referring to FIG. 4, the annular nature of the housing 40 and the drive disc 54 is apparent. Due to tolerance stack up and build variation, the various assembled components of the brake system 26 may vary in their actual physical center as compared to the axis 66. For example, the center of the rotor 52 may not perfectly coincide with the center of the shaft 50. Rather than being press-fit onto the shaft 50, the rotor 52 is engaged through the drive disc. 54. The drive disc 54 includes notches 110, 112 that are disposed in the outermost perimeter of the drive disc 54 and are spaced apart by 180 degrees. The rotor 52 includes tabs 118, 120 that project radially inward toward the axis 66 and are received in the notches 110, 112, respectively. As a result, the rotor 52 is engaged with the drive disc 54 to rotate therewith through the tabs 118, 120. The drive disc 54 also includes notches 114, 116 that are disposed in the innermost perimeter of the drive disc 54 and are spaced apart by 180 degrees. The shaft 50 includes tabs 122, 124 that project radially outward away from the axis 66 and are received in the notches 114, 116, respectively. As a result, the drive disc 54 is engaged with the shaft 50 to rotate therewith through the tabs 122, 124. The tabs 122, 124 are staggered relative to, and are spaced apart from, the tabs 118, 120 by ninety-degrees. In other words, the two sets of tabs 118, 120 and 122, 124, are oriented to be offset from each other by 90 degrees. By transmitting rotational forces through the drive disc 54, non-concentricity between the shaft 50 and the rotor 52 is compensated for, and a smooth torque curve is maintained through 360 degrees of rotation. In other words, binds or torque spikes that might otherwise arise due to non-concentricity, are avoided. In this example, the effect is achieved because the rotating torque is transmitted through the tabs 118, 120, 122, 124 tangentially, without a need for the outer components to be pressed over the inner components to provide the rotational engagement.

As will be appreciated by one skilled in the art, certain aspects the disclosed subject matter such as energizing the electromagnetic coil 92, may be embodied in the electrical system 34, or in a computer program product. Accordingly, certain embodiments may be implemented entirely as hardware, entirely as software (including firmware, resident software, micro-code, etc.) or as a combination of software and hardware (and other) aspects. Any suitable computer usable or computer readable medium may be utilized. The computer usable medium may be a computer readable signal medium or a computer readable storage medium. In the context of this document, a computer-usable, or computer-readable, storage medium may be any tangible medium that can contain, or store a program for use by or in connection with the instruction execution system, apparatus, or device.

Through the examples described above, a brake system for providing tactile feedback in a steering system is provided. The brake system includes a friction element engaging a rotor and imparting a base load on the rotor to require a base torque to rotate a steering wheel and the rotor. The magnitude of the base load is set by varying mating threads disposed between a fixed component and an intermediate component of the housing that houses the brake system. The brake system also includes an electromagnetic coil that when energized, applies a variable load to the rotor, increasing the torque required to rotate the steering wheel and the rotor above that of the base load itself. The variable load is varied by increasing or decreasing the current supplied to the electromagnetic coil. The variable load is calibrated by varying mating threads disposed between an adjustable component and the intermediate component of the housing. Torque is transferred through the brake system from a shaft to the rotor via a drive disc that compensates for non-concentricity, to provide consistent torque requirements around 360 degrees of rotation.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A brake system for providing tactile feedback comprising:
   a shaft configured to receive an input;
   a rotor, responsive to the shaft and configured to rotate in response to the input;

a friction element configured to impart a base load to the rotor; and a housing at least partly containing the shaft, the rotor and the friction element, the housing having a fixed housing component, an adjustable housing component that is variably positionable relative to the fixed housing component, and an intermediate housing component that couples the fixed housing component with the adjustable housing component;

wherein the friction element is disposed between, and engages, both the rotor and the intermediate housing.

2. The system of claim 1 wherein the friction element is conical in shape, the rotor includes a first conical surface contacting a first side of the friction element, and the intermediate housing component includes a second conical surface contacting a second side of the friction element.

3. The system of claim 1, wherein the intermediate housing component is connected with the fixed housing component by first mating threads and is connected with the adjustable housing component by second mating threads.

4. The system of claim 3, wherein the housing is configured to set the base load by rotating the intermediate housing component relative to the fixed housing component to vary the first mating threads.

5. The system of claim 4, wherein a variable load is applied to the rotor in addition to the base load, and the housing is configured to calibrate the variable load by rotating the adjustable housing component relative to the intermediate housing component to vary the second mating threads.

6. The system of claim 1, further comprising an electromagnetic coil disposed across an air gap from the rotor, the electromagnetic coil configured to apply a variable load to the rotor in addition to the base load.

7. The system of claim 6, wherein the electromagnetic coil is carried by the adjustable housing component and the housing is configured to calibrate the variable load by rotating the adjustable housing component relative to the intermediate housing component to vary the second mating threads, which varies the air gap.

8. The system of claim 1, further comprising a drive disc engaged between the shaft and the rotor wherein the base load is configured to act on the shaft via a torque transfer through the drive disc.

9. The system of claim 8, wherein the drive disc includes a first notch and a second notch located ninety-degrees from the first notch, the rotor includes a first tab disposed in the first notch, and the shaft includes a second tab disposed in the second notch, wherein the drive disc is configured to compensate for non-concentricity between the shaft and the rotor to smoothly transfer torque through the first and second tabs.

10. The system of claim 1, wherein:
the fixed housing component includes first internal threads and the intermediate housing component includes first external threads mating with the first internal threads as first mating threads configured to variably position the intermediate housing component relative to the rotor; and
the intermediate housing component includes second internal threads and the adjustable housing component includes second external threads mating with the second internal threads as second mating threads configured to variably position the adjustable housing relative to the rotor.

11. The system of claim 1, comprising an electromagnetic coil carried by the adjustable housing component, wherein the electromagnetic coil is configured to apply an electromagnetic force on the rotor that varies in response to variably positioning the adjustable housing relative to the rotor.

12. A brake system for providing tactile feedback in a vehicle steering system, the brake system comprising:
a shaft configured to receive a steering input;
a drive disc engaged with the shaft;
a rotor engaging the drive disc and configured to rotate in response to the steering input;
a friction element imparting a base load to the rotor, and configured to require a torque to rotate the rotor; and
a housing at least partly containing the shaft, the rotor and the friction element, the housing having a fixed housing component, an adjustable housing component that is variably positionable relative to the fixed housing component, and an intermediate housing component that couples the fixed housing component with the adjustable housing component;
wherein the friction element is disposed between and engages both the rotor and the intermediate housing component.

13. The system of claim 12 wherein the friction element is conical in shape and disposed around an axis with an inside facing toward the axis and an outside facing away from the axis, the rotor includes a first conical surface contacting the inside of the friction element, and the intermediate housing component includes a second conical surface contacting the outside of the friction element.

14. The system of claim 12, wherein the intermediate housing component is threaded to the fixed housing component by first mating threads and is threaded to the adjustable housing component by second mating threads.

15. The system of claim 12, wherein the housing is configured to set the base load by threading the intermediate housing component into the fixed housing component to clamp the friction element between the second conical surface and the first conical surface.

16. The system of claim 15, wherein a variable load is applied to the rotor in addition to the base load, and the housing is configured to calibrate the variable load by threading the adjustable housing component into the intermediate housing component to position the adjustable housing component relative to the fixed housing component.

17. The system of claim 12, further comprising an electromagnetic coil carried by the adjustable housing component and disposed across an air gap from the rotor, the electromagnetic coil configured to apply a variable load to the rotor in addition to the base load to increase the torque.

18. The system of claim 12, wherein the drive disc includes a first notch and a second notch located ninety-degrees from the first notch, the rotor includes a first tab disposed in the first notch and the shaft includes a second tab disposed in the second notch, wherein the drive disc is configured to compensate for non-concentricity between the shaft and the rotor to smoothly transfer torque through the first and second tabs.

19. The system of claim 12, comprising an electromagnetic coil carried by the adjustable housing component, wherein the electromagnetic coil is configured to apply an electromagnetic force on the rotor that varies in response to variably positioning the adjustable housing relative to the rotor.

20. A brake system for providing tactile feedback to a steering wheel of a vehicle, the brake system comprising:
a shaft configured to receive a steering input from the steering wheel;

a drive disc engaged with the shaft;
a rotor engaging the drive disc and configured to rotate in response to the steering input, wherein the drive disc is configured to provide a smooth torque transfer between the shaft and the rotor without torque spikes;
a friction element engaging the rotor and imparting a base load on the rotor and configured to require a torque to rotate the rotor;
an electromagnetic coil disposed adjacent the rotor, the electromagnetic coil configured to apply a variable load to the rotor in addition to the base load to increase the torque; and
a housing disposed around the shaft, the rotor, the friction element, and the electromagnetic coil, the housing having a fixed housing component connected with the vehicle, an adjustable housing component that is variably positionable relative to the fixed housing component, and an intermediate housing component that couples the fixed housing component with the adjustable housing component;
wherein the friction element is disposed between and engages both the rotor and the intermediate housing component.

\* \* \* \* \*